United States Patent [19]

Kai

[11] 3,928,723

[45] Dec. 23, 1975

[54] TELEPHONE SET WITH BUILT-IN LOUDSPEAKER

[76] Inventor: Kazuo Kai, 12 Kuwazucho 6-chome, Higashi Sumiyoshi, Osaka, Osaka, Japan

[22] Filed: June 26, 1974

[21] Appl. No.: 483,103

[30] Foreign Application Priority Data

| | | |
|---|---|---|
| July 2, 1973 | Japan | 48-78601[U] |
| July 2, 1973 | Japan | 48-78602[U] |
| July 2, 1973 | Japan | 48-78603[U] |
| Sept. 4, 1973 | Japan | 48-103792[U] |

[52] U.S. Cl. .......... 179/1 FS; 179/1 HF; 179/100 L

[51] Int. Cl.² ...................... H04M 1/20; H04M 1/60

[58] Field of Search ...... 179/1 C, 1 HF, 2 C, 100 R, 179/100 D, 100 L, 1 F, 1 FS, 112, 180, 81 B

[56] References Cited

UNITED STATES PATENTS

| | | | |
|---|---|---|---|
| 1,519,211 | 12/1924 | Martin | 179/1 F |
| 1,645,282 | 10/1927 | Hanna | 179/1 F |
| 2,433,295 | 12/1947 | Riebe | 179/100 L |
| 2,657,265 | 10/1953 | Branson et al. | 179/1 C |
| 2,775,309 | 12/1956 | Villchur | 179/180 |
| 2,952,739 | 9/1960 | Lehman | 179/1 C |
| 2,987,575 | 6/1961 | Chalfin | 179/1 C |
| 3,118,972 | 1/1964 | Walczak | 179/1 F |
| 3,136,852 | 6/1964 | Kay | 179/1 C |
| 3,617,654 | 11/1971 | Heidrich | 179/180 |
| 3,887,771 | 6/1975 | Spanel | 179/1 C |

*Primary Examiner*—Kathleen H. Claffy
*Assistant Examiner*—Randall P. Myers
*Attorney, Agent, or Firm*—Merchant, Gould, Smith, Edell Welter & Schmidt

[57] ABSTRACT

Telephone set with built-in loudspeaker includes a transmitter which is positioned either near the focusing point of a reflector or the focusing point of a focusing horn when a receiver is placed on a stand of said telephone set, a pickup coil which is positioned facing to a receiver when said receiver is placed on said stand and a low frequency amplifier the input of which is connected to said pickup coil when a switch is closed and the output of which is connected to a speaker. The present invention comprises a speaker case having heavy weight which has an open portion and receives said speaker, a pickup coil which is coupled to a feedback coil and said pickup coil is connected from the output of said amplifier via a feedback resistor to said feedback coil elastic bodies which fix said speaker case to said stand, and a short horn which has a narrow throat and is provided with a gap of about 0.2 through 1.0 mm on a front plate on said speaker case.

4 Claims, 11 Drawing Figures

TELEPHONE SET WITH BUILT-IN LOUDSPEAKER

The present invention relates to a telephone set with built-in loudspeaker, and more especially relates to an improvement of the telephone set which provides a telephone stand for amplifying a received voice, a pickup coil positioned to face the receiver of a telephone, an amplifier for amplifying the output of the pickup coil, a speaker which is connected to the output of the amplifier, and a focusing phone or a reflecting plate which faces to the transmitter.

The howling phenomenon produced in a conventional telephone set with built-in loudspeaker makes telecommunication with sufficient sound volume impossible. The howling phenomenon is the result of an incomplete anti-side tone circuit. That is, when the anti-side tone circuit is not complete, the amplified receiving sound which is diffused from the speaker is fed back to the transmitter and if the setting of the amplifier is increased, howling is produced.

For the purpose of overcoming the above-mentioned drawback and preventing the coupling between the speaker and the transmitter, either a horn was provided for the speaker or a focusing horn was provided for the transmitter. However, said two kinds of horns were not entirely effective. Therefore, to overcome this problem, another set for the speaker was provided so that the speaker was stationed at a distance from the telephone set. However, this system requires a large space for both the telephone and speaker sets, handling and maintenance are inconvenient and the communication is difficult since the speaker is at a distance.

The object of the present invention is to provide a novel telephone set with a built-in loudspeaker in the same set, which prevents the howling phenomenon, can obtain the sound output of the speaker which larger by 3 – 6 decibels than that of conventional sets and has a sufficient sound level.

Further features and advantages of the present invention will be apparent from the ensuing description with reference to the accompanying drawing to which, however, the scope of the invention is in no way limited.

Figure 1:
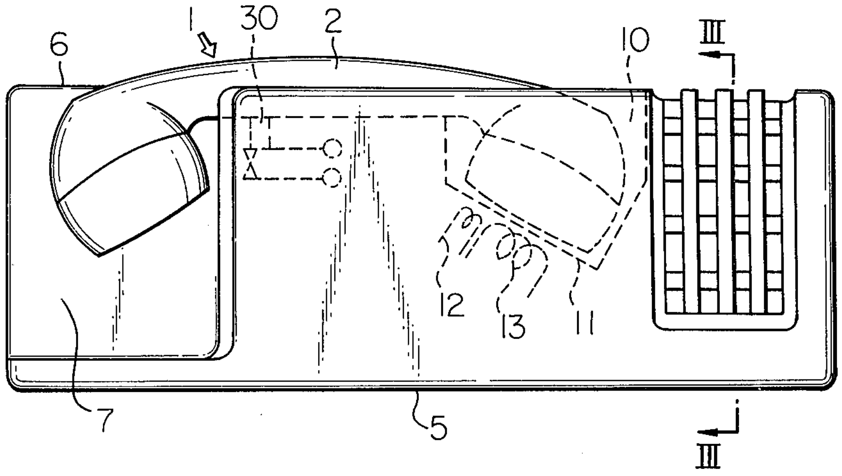
FIG. 1 is a front view of the telephone set with the sound amplifier of the present invention.
Figure 2:
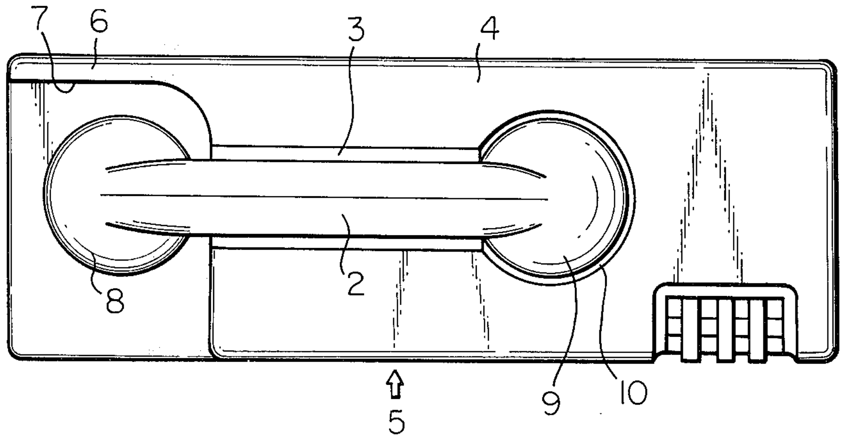
FIG. 2 is a plan view of the telephone set with the sound amplifier shown in FIG. 1.
Figure 4:
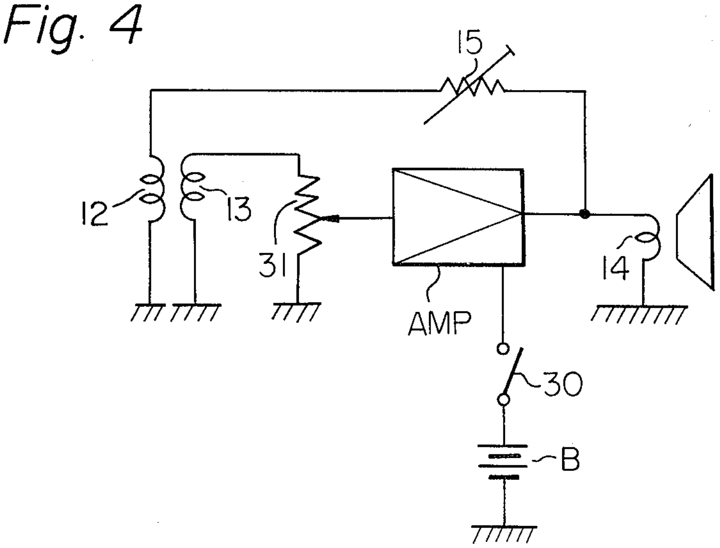
FIG. 4 is a circuit diagram of the telephone set of the present invention.
Figure 5:
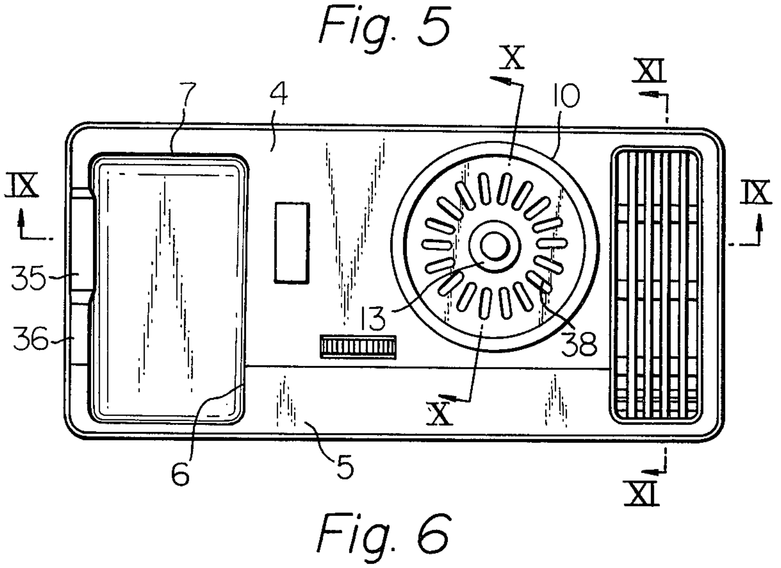
FIG. 5 is a plan view of another embodiment of the telephone set according to the present invention.
Figure 6:
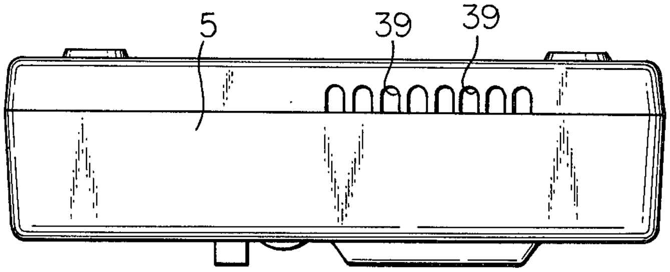
FIG. 6 is a back view of the embodiment shown in FIG. 5.
Figure 7:
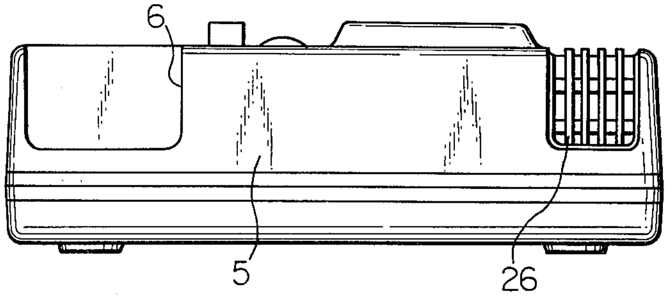
FIG. 7 is a front view of the embodiment shown in FIG. 5.
Figure 8:
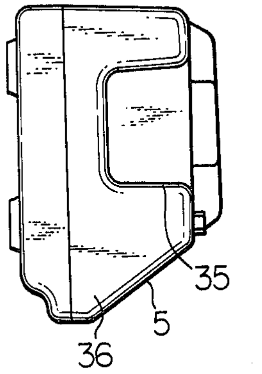
FIG. 8 is a left side view of the embodiment shown in FIG. 5.

Referring to FIGS. 1 and 2, a telephone stand 5 has provided on its upper surface 4 a groove 3 for placing a receiver 2 of the telephone 1. On one side of the stand 5, a stand wall portion 6 which forms a reflecting plate 7, is provided. The transmitter 8 of the receiver 2 is positioned near the focusing point of the reflecting plate 7, and the other side of the receiver 2, is positioned in a cavity 10 for receiving an ear-piece 9. Under the bottom surface of the cavity 10, a pickup coil 13 is provided with a feed back coil 12. The pickup coil 13 as shown in FIG. 4, is connected to the input of an amplifier AMP, and the output of the amplifier AMP is connected to a speaker 14. The output of the amplifier AMP is also connected via a feedback resistor 15 to a feedback coil 12 coupled to a pickup coil 13.

The speaker 14 is placed on a rubber plate 20 into a speaker case 19. The speaker case 19 is composed of a front plate 17 which is composed of a heavy metal such as iron, lead, or zinc and is provided with an open portion 16 for diffusing sound. A rear face cover 18 is composed of the same material as the front plate 17. A short horn 22 having a narrow-throat portion 21 is provided in front of the front plate 17 of the speaker case between spacers 23 which forms a gap 24. On the portions of the stand where the speaker case 19 is attached, a sink portion 25 is provided. This portion 25 is covered with an ornamental plate 26 which can pass the sound. The short horn 22 is attached to the ornamental plate 26 of the stand 5 via soft elastic bodies 27 composed of foam-plastic material, and the speaker case 19 is fixed to a bottom plate 29 of the stand 5 via a similar elastic body 28. A switch 30 is closed by the weight of the telephone 1 and connects the amplifier AMP to an electric source B. A variable resistor 31 is connected between the pickup coil 13 and the amplifier AMP.

In the above-mentioned telephone set, when the telephone 1 is placed on the stand 5, the transmitter 8 is positioned near the focusing point of the reflecting plate 7, the ear-piece 9 is positioned facing to the pickup coil 13 and the switch 30 is closed so that the electric source B is connected to the amplifier AMP. Therefore, the leakage flux of the received voice is picked up by the pickup coil 13, amplified by the amplifier AMP and also amplified by the speaker and by the open portion 16 provided in front of the speaker 14. The transmitting voice is reflected by the reflecting plate 7 and focused to the transmitter 8 and makes communication possible. That is, communication can be carried out without touching the telephone, leaving the receiver on the stand.

In the conventional telephone set with a built-in loudspeaker, the variable resistor 31 for adjusting the sound volume is inserted between the pickup coil 13 and the amplifier AMP. However, even if the anti-side tone circuit decreases the voice which arrives to the transmitter 8 from the speaker 14, the sound leakage which reaches the ear-piece 9 produces the howling phenomenon and sufficient sound volume cannot be obtained.

In the present invention, part of the output of the amplifier AMP is negatively fed back to the feedback coil of the pickup coil 13 via the resistor 15, and the number of turns of the feedback coil 12 is determined so that the amount of the feedback is equal to that of the leakage sound voice, and the variable resistor 15 finely adjusts the amount of the feedback. Therefore, the sufficient sound volume can be obtained.

When the number of turns of the feedback coil is selected to be ($1/10x$ through $1/100y$) of the number of turns of the pickup coil (wherein $x$ and $y$ may be any positive integer from one through nine) and the value of the variable resistor 15 is selected from 3 kΩ through 100 kΩ, the output of the speaker 14 can be increased 3 db through 6 db over that of a set which has no feedback circuit. As has already been said, in the present invention, the speaker is fixed in the heavy speaker case 19 and said speaker case 19 is attached to the bottom 29 of the stand 5 via the elastic body 28. Also, because of the short horn 22, communication can be carried out with sufficient sound volume.

For example, when a moving coil speaker having a small inner diameter and an outer diameter of 55 mm is placed in the speaker case 19 having an inner diameter of 55.5 mm and a length of about 18 mm, and when the thickness of the speaker case 19 and the front plate 17 is selected 3 mm, 5 mm and 7 mm, the anti-howling effect increases with said increase in the thickness of the speaker case and the front plate. That is, when the thickness is 3 mm, the anti-howling effect is still too large for practical use. When the thickness is more than 5 mm, a good sound voice can be obtained.

Prior arts concerning the telephone set with built-in loudspeaker were intended to prevent a coupling in the space between the speaker and the telephone. However, as the howling is caused by the vibration of the speaker being transmitted via the stand to the transmitter, which usually a carbon microphone. In the present invention, by housing the speaker 14 in the speaker case 19 having heavy weight, the howling phenomenon is prevented. The coupling in space can be decreased by using the short horn 22, thereby decreasing the howling phenomenon further. Also, the transmission of the vibration of the speaker to the stand 5 is stopped by supporting the speaker case 19 on the elastic bodies 27, 28, as mentioned before.

And, when the space 24 is provided between the short horn 22 having the narrow throat portion 21 and the front plate 17 of the speaker case 19, an air chamber is formed in front of the speaker 14. When the space 24 is not provided, a high frequency tone is considerably decreased and articulation becomes less clear. However, when the space 24 is increased, the attenuation of the high frequency tone decreases and the articulation sound can be improved and the directivity is improved by using the short horn 22. When we used a speaker with a 50 mm diameter, together with a cone horn having a diameter of 5 through 20 mm and a vertical angle of 45° through 90° with a gap 0.2 through 1.0 mm, satisfactory results with respect to the quality and directivity were obtained. The length of the horn must be 2 through 5 times the diameter of the throat portion.

The low resonance frequency of the speaker can be increased by tightly closing the speaker case 19, whereby the high resonance frequency of the speaker is cut by increasing the gap 24 of the short horn 22, and thus a mechanical band pass filter having a band 300 Hz through 3000 Hz which is required for telephone communication, is formed. Therefore, the amplifier AMP used in the present application, can be very simple and a general purpose amplifier can be utilized.

Figure 3:
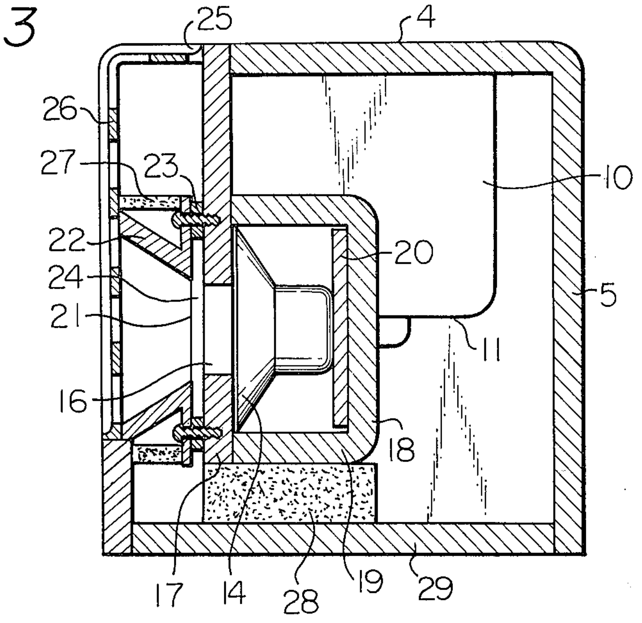
FIG. 3 is a cross-sectional view along III—III of telephone set shown in FIG. 1.

FIGS. 5 through 11 concern another embodiment of the present invention. The reference numerals from FIGS. 1 through 3 are also used in these figures.

In the second embodiment, the axis of the opening portion of the short horn 22 is directed obliquely upward, and a wall 36 having a cutting portion 35 is formed on the left side of the stand 5. A pickup coil 13 which is moved slightly up and down by spring 37 is provided on the bottom surface 11 of the hollowed portion 10 which receives the ear-piece 9. Vent holes 38 are provided around the coil in the lower portion of the stand.

Figure 9:
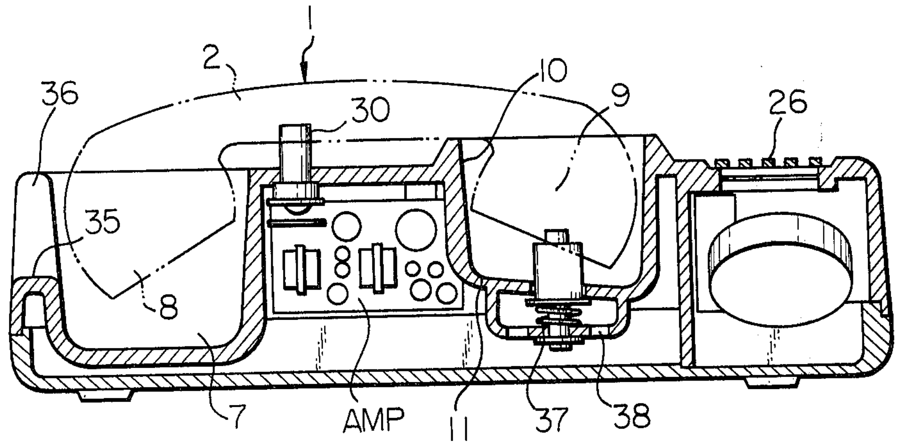
FIG. 9 is an enlarged cross-sectional view along IV—IV of the embodiment shown in FIG. 5.
Figure 10:
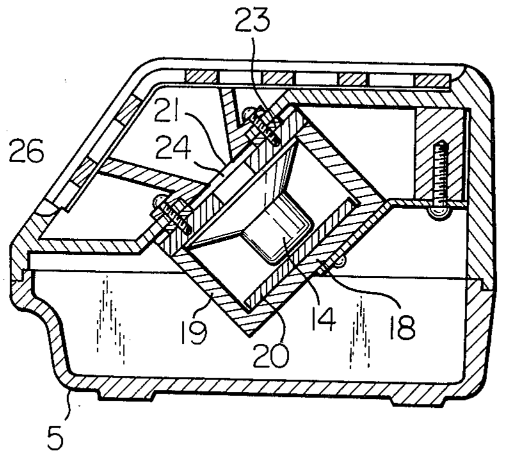
FIG. 10 is an enlarged cross-sectional view along X—X of the embodiment shown in FIG. 5; and, FIG. 11 is an enlarged cross-sectional view along XI—XI of the embodiment shown in FIG. 5.
Figure 11:
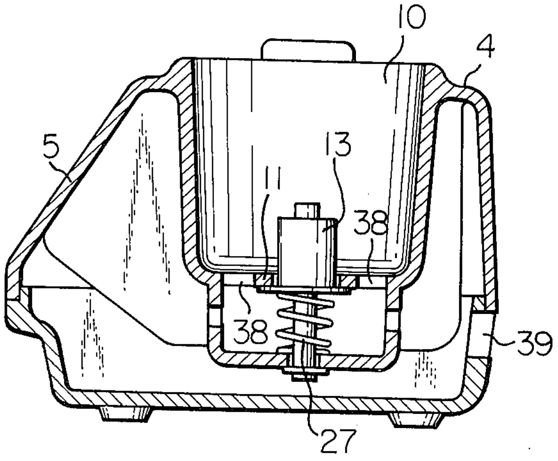

In this embodiment, as the pickup coil 13 slightly moves up and down, it is always in contact with the ear-piece 9 when the receiver 2 is placed on the stand 5. Therefore, a sufficient voltage is induced in the pickup coil. And further, the voice which arrives via a transmitter 8 and is leaked from the transmitter 8 to the ear-piece 9 via the anti-side tone circuit of the telephone set is diffused backwards, via said vent holes 38 and by the vent hole 39 which is provided on the lower portion of the rear side of the stand. Therefore, the volume of sound can be increased without causing the howling phenomenon. In this embodiment, the bottom surface 11 of the hollowed portion 10 is slightly inclined so that the surface of the ear-piece 9 becomes parallel with the bottom surface 11, as seen in FIG. 9.

As is explained in detail above, when the present invention is applied to the usual telephone set, the following advantages can be obtained. That is, (a) when the sound volume is increased so that the sound applied to the transmitter is diffused from the receiver with amplification, the howling phenomenon is not produced and communication can be carried out effectively with sufficient voice level, (b) since the speaker is housed in the same case space is considerably economized and handling becomes very easy and (c) because the amplifier requires no special circuit or element, the cost of the telephone set is small.

What is claimed is:

1. A telephone set having a built-in speaker for use with a telephone receiver, comprising:

a. a stand having a cradle formed therein for holding a telephone receiver, said stand having a sound reflector or focusing horn with a focusing point at the position of the transmitter of the receiver when placed in the cradle;
b. a pickup coil positioned in said stand to face the receiver when it is placed in the cradle;
c. an amplifier having an input connected to said pickup coil and having an output;
d. a switch positioned on said stand for actuation by the receiver when placed in said cradle, said switch for connecting said amplifier to a source of power when actuated by the receiver;
e. a speaker case mounted within said stand;
f. a speaker mounted within said speaker case and connected to said output of said amplifier;
g. a feedback coil coupled to said pickup coil; and
h. a feedback resistor connected from the output of said amplifier to said feedback coil.

2. A telephone set having a built-in speaker according to claim 1 wherein the number of turns of said feedback coil is selected to be from one-tenth x to one one-hundredth y of the number of turns of said pickup coil, where $x$ and $y$ are positive integers from 1 through 9.

3. A telephone set having a built-in speaker according to claim 1 further including elastic members positioned between said speaker case and said stand, and further including a rubber member positioned within said speaker case.

4. A telephone set having a built-in speaker according to claim 1, wherein said speaker case has a front portion having a sound-passing aperture formed therein aligned with said speaker, and further including a short horn having a narrow throat portion, and means for positioning said horn in alignment with said aperture and said speaker with said throat portion spaced apart from said front portion of said speaker case to form a gap of about 0.2 mm through 1.0 mm therebetween.

* * * * *